United States Patent
Chen et al.

(10) Patent No.: US 12,422,690 B2
(45) Date of Patent: Sep. 23, 2025

(54) OPTICAL CIRCULATOR AND OPTICAL MODULE

(71) Applicant: InnoLight Technology (Suzhou) Ltd., Suzhou (CN)

(72) Inventors: Long Chen, Suzhou (CN); Yu-Zhou Sun, Suzhou (CN); Li-xiang Li, Suzhou (CN)

(73) Assignee: INNOLIGHT TECHNOLOGY (SUZHOU) LTD., Suzhou (CN)

( * ) Notice: Subject to any disclaimer, the term of this patent is extended or adjusted under 35 U.S.C. 154(b) by 248 days.

(21) Appl. No.: 18/138,171

(22) Filed: Apr. 24, 2023

(65) Prior Publication Data
US 2023/0266598 A1 Aug. 24, 2023

(30) Foreign Application Priority Data

Feb. 24, 2022 (CN) .......................... 202220380584.X
Jun. 10, 2022 (CN) .......................... 202221440964.4

(51) Int. Cl.
*G02B 27/28* (2006.01)
*G02B 17/08* (2006.01)
*G02F 1/01* (2006.01)
*G02F 1/09* (2006.01)
*H04J 14/02* (2006.01)

(52) U.S. Cl.
CPC .......... *G02B 27/285* (2013.01); *G02F 1/0136* (2013.01); *G02F 1/093* (2013.01); *H04J 14/0307* (2023.08); *G02B 17/0856* (2013.01)

(58) Field of Classification Search
CPC .............. G02B 27/285; G02B 17/0856; G02B 27/283; G02B 27/28; G02B 6/26; G02B 6/2713; G02B 6/272; G02B 27/286; G02B 6/126; G02B 6/2773; H04J 14/0307;
(Continued)

(56) References Cited

U.S. PATENT DOCUMENTS

| 10,948,598 B1* | 3/2021 | Prabhakar ............... G01S 7/499 |
| 2019/0171029 A1* | 6/2019 | Urata ....................... G02F 1/093 |
| 2020/0244047 A1* | 7/2020 | Ota ......................... H01S 3/0085 |

FOREIGN PATENT DOCUMENTS

| CN | 104730641 A | 6/2015 |
| CN | 205229520 U | 5/2016 |

* cited by examiner

Primary Examiner — Hibret A Woldekidan
(74) Attorney, Agent, or Firm — Li & Cai Intellectual Property (USA) Office

(57) ABSTRACT

An optical circulator and an optical module are provided. The optical circulator includes a first polarization beam splitter member having a common optical port, a second polarization beam splitter member having an emittance optical port and at least two receiving optical ports, and a first polarization adjustment member. The two receiving optical ports respectively receive two linearly polarized light beams. The two linearly polarized light beams respectively pass through the second polarization beam splitter member, and sequentially pass through the first polarization adjustment member and the first polarization beam splitter member to be combined into a first combined light beam for being output from the common optical port. The common optical port receives a compound optical signal that passes through the first polarization beam splitter member to be split into another two linearly polarized light beams that are combined into a second combined light beam for being output.

13 Claims, 7 Drawing Sheets

(58) Field of Classification Search
CPC ........ H04J 14/06; G02F 1/0136; G02F 1/093; G02F 1/13355; G02F 1/13362; G02F 2203/07

See application file for complete search history.

OPTICAL CIRCULATOR AND OPTICAL MODULE

CROSS-REFERENCE TO RELATED PATENT APPLICATION

This application claims the benefit of priorities to China Patent Application No. 202221440964.4, filed on Jun. 10, 2022, and No. 202220380584.X, filed on Feb. 24, 2022 in People's Republic of China. The entire contents of the above identified applications are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to the field of optical communication, and more particularly to an optical circulator and an optical module.

BACKGROUND OF THE DISCLOSURE

With the advancement of communication technologies, optical communication technology is widely used in various communication application scenarios. In the optical communication technology, an optical module is indispensable and of high importance in the application of the optical communication technology, and an optimal design of the structure of the optical module has become an important issue in the field of optical communication technology.

In relevant technologies, the optical module mainly includes a photoelectric structure and a signal processing circuit for processing photoelectric signals. In a single-fiber bi-directional optical module, the abovementioned photoelectric structure includes an optical emitting member, an optical receiving member, an optical circulator, and an optical interface. One optical fiber corresponds to one optical module, and the optical interface is connected to external optical communication devices through the optical fiber to implement a mutual optical signal transmission between the optical interface and the external optical communication devices. Incident light beams emitted by the optical emitting member are transmitted to the external optical communication device through the optical interface after passing through the optical circulator, and the optical interface transmits incident light beams received from the external optical communication device to the optical receiver member after the incident light beams pass through the optical circulator.

However, a conventional optical circulator is generally a three-port optical circulator that includes a transmitting port, a receiving port, and a common port for bi-directionally transmitting optical signals. When a transmission rate of the optical module is required to be higher and more optical channels are integrated in the optical module, more stages of wavelength division multiplexers need to be used for combining light, or quantities of the optical circulators and optical ports need to be increased and more optical fibers need to be used for bi-directional transmission. Therefore, the optical module becomes structurally complexed, incurs high cost, and becomes more difficult to assemble due to a size limitation of a housing of the optical module.

SUMMARY OF THE DISCLOSURE

In response to the above-referenced technical inadequacies, the present disclosure provides an optical circulator and an optical module to address issues of a conventional technology having a low use rate of optical fibers and a high amount of optical fibers being used that cause wastage of optical fibers.

In one aspect, the present disclosure provides an optical circulator. The optical circulator includes a first polarization beam splitter member, a second polarization beam splitter member, and a first polarization adjustment member. The first polarization beam splitter member has a common optical port. The second polarization beam splitter member has an emittance optical port and at least two receiving optical ports. The first polarization adjustment member is located between the first polarization beam splitter member and the second polarization beam splitter member and is configured to uni-directionally adjust polarization states of light beams. The at least two receiving optical ports respectively receive two linearly polarized light beams having different polarization states, and the two linearly polarized light beams include a first linearly polarized light beam and a second linearly polarized light beam. The first linearly polarized light beam and the second linearly polarized light beam respectively pass through the second polarization beam splitter member, and sequentially pass through the first polarization adjustment member and the first polarization beam splitter member to be combined into a first combined light beam for being output from the common optical port. The common optical port is configured to receive a compound optical signal, the compound optical signal passes through the first polarization beam splitter member to be split into another two linearly polarized light beams having different polarization states, and the another two linearly polarized light beams include a third linearly polarized light beam and a fourth linearly polarized light beam. The third linearly polarized light beam and the fourth linearly polarized light beam pass through the first polarization adjustment member to change the polarization states thereof, and then pass through the second polarization beam splitter member to be combined into a second combined light beam for being output from the emittance optical port.

In the abovementioned optical circulator, by the design of the first polarization beam splitter member having a common optical port and the second polarization beam splitter member having an emittance optical port and at least two receiving optical ports, a first linearly polarized light beam and a second linearly polarized light beam having different polarization states can be combined into a first combined light beam for being output from the common optical port. Furthermore, a compound optical signal that is received can be split into a third linearly polarized light beam and a fourth linearly polarized light beam that are further combined into a second combined light beam for being output. In practical applications, the common optical port is optically coupled to an external optical fiber to achieve an optical signal transmission therebetween. By the design of the abovementioned structure, a use rate of the optical fibers can be increased, and an amount of the optical fibers used can be decreased so as to save optical fibers; furthermore, the optical circulator can have a compact and simple structure.

In another aspect, the present disclosure provides an optical module. The optical module includes the abovementioned optical circulator, and the optical module further includes at least two emitting members, a receiving member, and an optical interface. The at least two emitting members are respectively disposed opposite to the at least two receiving optical ports of the optical circulator. The receiving member is disposed opposite to the emittance optical port. The optical interface is disposed opposite to the common optical port. Light beams respectively emitted by each of the emitting members respectively travel to a corresponding one of the receiving optical ports disposed opposite to each of the emitting members, and an optical isolator and a half-wave plate are sequentially disposed between each of the emitting members and the corresponding one of the receiving optical ports of the optical circulator. Before a plurality of incident light beams travel to the receiving optical ports, the optical isolator and the half-wave plate respectively polarize a part of the plurality of incident light beams into the first linearly polarized light beam, and another part of the plurality of incident light beams into the second linearly polarized light beam. The first linearly polarized light beam and the second linearly polarized light beam are combined by the optical circulator into the first combined light beam that is output to the optical interface, and the first combined light beam is output to external optical communication devices by the optical interface. The optical interface is further configured to receive an external compound optical signal and transmit the external compound optical signal that is received to the common optical port of the optical circulator. The receiving member is configured to receive the second combined light beam emitted from the emittance optical port of the optical circulator.

In the abovementioned optical module, by the adoption of the abovementioned optical circulator, a use rate of the optical fibers can be increased, and an amount of the optical fibers used can be decreased so as to save optical fibers; furthermore, due to the optical circulator having a compact and simple structure, it is conducive to miniaturization of optical modules and improvement of integration.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
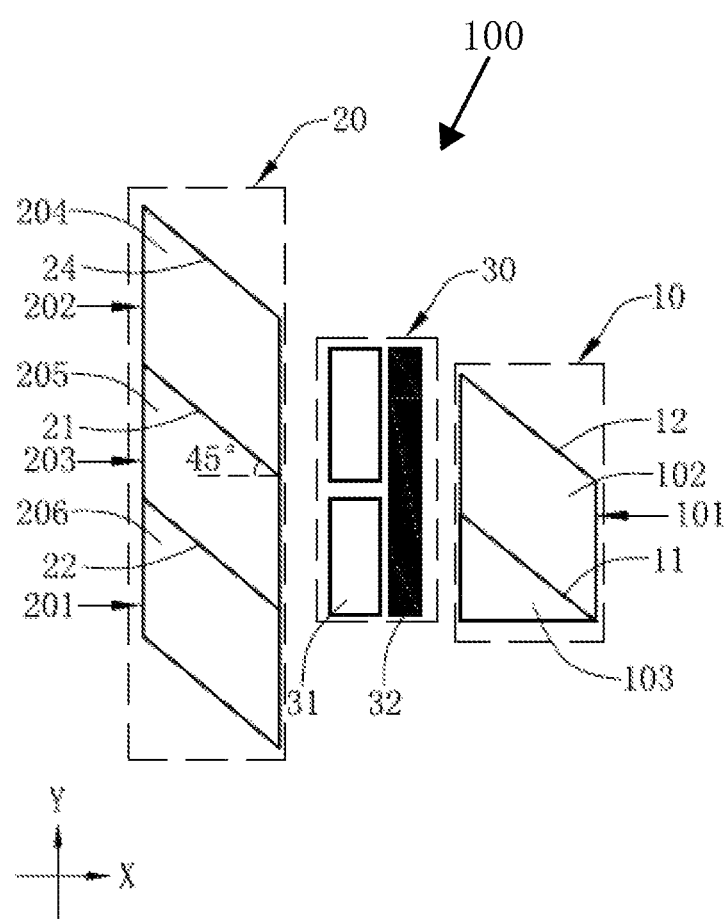
FIG. 1 is a schematic view of the structure of an optical circulator according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
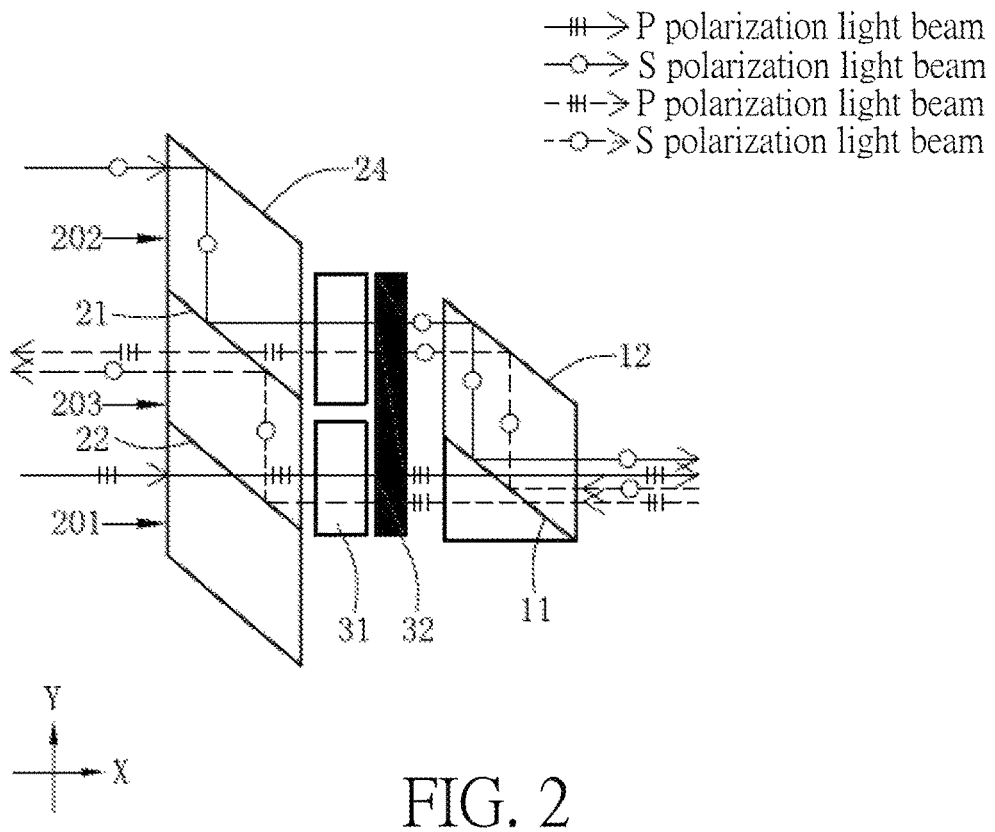
FIG. 2 is a schematic view of light beam transmission of the optical circulator of FIG. 1 in one embodiment.

Referring to FIG. 1 and FIG. 2, the present disclosure provides an optical circulator 100 that includes a first polarization beam splitter member 10, a second polarization beam splitter member 20, and a first polarization adjustment member 30. The first polarization adjustment member 30 is located between the first polarization beam splitter member 10 and the second polarization beam splitter member 20.

The second polarization beam splitter member 20 has at least two receiving optical ports and an emittance optical port 203, the first polarization beam splitter member 10 has a common optical port 101, and the first polarization adjustment member 30 is configured to uni-directionally adjust polarization states of light beams.

The second polarization beam splitter member 20 has at least two receiving optical ports that are a first receiving optical port 201 and a second receiving optical port 202. The two receiving optical ports respectively receive two linearly polarized light beams having different polarization states, and the two linearly polarized light beams include a first linearly polarized light beam and a second linearly polarized light beam. For example, if a polarization state of the first linearly polarized light beam is a P polarization state, a polarization state of the second linearly polarized light beam can be an S polarization state. Specifically, the first receiving optical port 201 is configured to receive the first linearly polarized light beam, and the second receiving optical port 202 is configured to receive the second linearly polarized light beam. Naturally, in other embodiments, according to practical optical structural designs, a number of the receiving optical ports on the second polarization beam splitter member 20 can be more than two, and it will not be reiterated herein.

The first linearly polarized light beam and the second linearly polarized light beam respectively pass through the second polarization beam splitter member 20, and sequentially pass through the first polarization adjustment member 30 to travel to the first polarization beam splitter member 10. Before or after the first and second linearly polarized light beams pass through the first polarization adjustment member 30, the polarization states of the first linearly polarized light beam and the second linearly polarized light beam are not changed, and the first and second linearly polarized light beams are combined into a first combined light beam at the first polarization beam splitter member 10 for being output from the common optical port 101.

The common optical port 101 is configured to receive a compound optical signal that enters from external sources and has an arbitrary or a randomized polarization state. The compound optical signal passes through the first polarization beam splitter member 10 to be split into another two linearly polarized light beams having different polarization states, and the another two linearly polarized light beams include a third linearly polarized light beam and a fourth linearly polarized light beam. For example, if a polarization state of the third linearly polarized light beam is a P polarization state, a polarization state of the fourth linearly polarized light beam can be an S polarization state.

The third linearly polarized light beam and the fourth linearly polarized light beam pass through the first polarization adjustment member 30 to change the polarization states thereof. For example, the polarization state of the third linearly polarized light beam changes from the P polarization state to the S polarization state, and the polarization state of the fourth linearly polarized light beam changes from the S polarization state to the P polarization state. The third and fourth linearly polarized light beams having polarization states that are changed then pass through the second polarization beam splitter member 20 to be combined into a second combined light beam for being output from the emittance optical port 203.

In the abovementioned structure, by the design of the first polarization beam splitter member 10 having a common optical port 101 and the second polarization beam splitter member 20 having an emittance optical port 203 and at least two receiving optical ports, a first linearly polarized light beam and a second linearly polarized light beam having different polarization states can be combined into a first combined light beam for being output from the common optical port 101. Furthermore, a compound optical signal that is received can be split into a third linearly polarized light beam and a fourth linearly polarized light beam that are further combined into a second combined light beam for being output. In practical applications, the common optical port 101 is optically coupled to an external optical fiber to achieve an optical signal transmission therebetween. By the design of the abovementioned structure, a use rate of the optical fibers can be increased, and an amount of the optical fibers used can be decreased so as to save optical fibers; furthermore, the optical circulator 100 can have a compact and simple structure.

It should be note that, the first polarization beam splitter member 10 and the second polarization beam splitter member 20 each has a structure of a polarization beam splitter, and a polarization splitter surface is disposed on the polarization beam splitter. The polarization splitter surface is used to perform beam splitting on two linearly polarized light beams having different polarization states. That is, the polarization splitter surface allows one light beam of the two linearly polarized light beams to pass therethrough, and reflect another light beam. For example, the polarization splitter surface of the polarization beam splitter allows a light beam having a P polarization state to pass therethrough, and reflects a light beam having an S polarization state. Furthermore, the first polarization beam splitter member 10 and/or the second polarization beam splitter member 20 can have a reflection surface disposed thereon that reflects all light beams. It should be noted that, quantities and positions of the polarization splitter surface and the reflection surface disposed on the first polarization beam splitter member 10 and the second polarization beam splitter member 20 are not limited herein, for ease of understanding, the following will be described in detail in conjunction with practical embodiments.

Specifically, as shown in FIG. 1 and FIG. 2, in certain embodiments, the first polarization beam splitter member 10 includes a first polarization splitter surface 11 and a first reflection surface 12, and the second polarization beam splitter member 20 includes at least two polarization splitter surfaces that include a second polarization splitter surface 21 and a third polarization splitter surface 22.

It should be noted that, relative positioning of the first polarization splitter surface 11, the first reflection surface 12, the second polarization splitter surface 21, and the third polarization splitter surface 22 are not limited in the present disclosure. In practical applications, a design of optical paths of light beams can be adjusted by adjusting relative positioning of each of the polarization splitter surfaces and the reflection surfaces.

Specifically, a first direction (i.e., an x-axis direction) is parallel to a minor axis direction of the second polarization beam splitter member 20, a second direction (i.e., a y-axis direction) is parallel to a major axis direction of the second polarization beam splitter member 20, and the first direction and the second direction are perpendicular to each other.

Specifically, the first polarization beam splitter member 10, the first polarization adjustment member 30, and the second polarization beam splitter member 20 are sequentially disposed along the first direction. The second polarization beam splitter member 20 and the first polarization beam splitter member 10 are each formed by a plurality of optical prisms being glued together, and a practical structure of the second polarization beam splitter member 20 and the first polarization beam splitter member 10 can be configured according to practical requirements of productions or applications. For example, in certain embodiments, the first polarization beam splitter member 10 includes at least one first prism 102. The at least one first prism 102 has two surfaces that face away from each other, and the first polarization splitter surface 11 and the first reflection surface 12 are respectively disposed on the two surfaces that face away from each other of the at least one first prism 102. The common optical port 101 is disposed on one side of the first prism 102. Furthermore, according to requirements, the first prism 102 can be disposed to stack on a prism 103, and the first polarization splitter surface 11 is located between the first prism 102 and the prism 103.

The second polarization beam splitter member 20 includes a second prism 204 and a third prism 205 that are stacked along a second direction, the second polarization splitter surface 21 is disposed between the second prism 204 and the third prism 205, and the third polarization splitter surface 22 is disposed on a surface of the third prism 205 facing away from the second prism 204.

More specifically, in certain embodiments, the second polarization splitter surface 21 and the third polarization splitter surface 22 are disposed to be parallel with each other, and the first polarization splitter surface 11 and the first reflection surface 12 are disposed to be parallel with each other. Moreover, the first polarization splitter surface 11 and the first reflection surface 12 are disposed opposite to each other along the second direction, the second polarization splitter surface 21 and the third polarization splitter surface 22 are disposed opposite to each other along the second direction, and the first polarization splitter surface 11, the first reflection surface 12, the second polarization splitter surface 21, and the third polarization splitter surface 22 are parallel to each other and arranged to respectively form an included angle of 45° with the first direction and the second direction.

In the aforementioned structure, the second polarization splitter surface 21 and/or the third polarization splitter surface 22 allows the first linearly polarized light beam having the P polarization state to pass therethrough and reflects the second linearly polarized light beam having the S polarization state. After passing through the second polarization beam splitter member 20, the first linearly polarized light beam and the second linearly polarized light beam can travel to the first polarization adjustment member 30 along different optical paths. The second linearly polarized light beam that comes out from the first polarization adjustment member 30 is sequentially reflected by the first reflection surface 12 and the first polarization splitter surface 11, and the first linearly polarized light beam that comes out from the first polarization adjustment member 30 passes through the first polarization splitter surface 11, so that the first and second linearly polarized light beams are combined into the first combined light beam at the first polarization splitter surface 11 for being output.

The first polarization splitter surface 11 allows the third linearly polarized light beam having the P polarization state to pass therethrough to the first polarization adjustment member 30, and reflects the fourth linearly polarized light beam having the S polarization state to the first reflection surface 12, and the first reflection surface 12 then reflects the fourth linearly polarized light beam to the first polarization adjustment member 30. Therefore, after passing through the first polarization beam splitter member 10, the third linearly polarized light beam and the fourth linearly polarized light beam can travel to the first polarization adjustment member 30 along different optical paths to change polarization states thereof, such that the polarization states of the third linearly polarized light beam and the fourth linearly polarized light beam are interchanged. Specifically, a polarization state of the third linearly polarized light beam changes from the P polarization state to the S polarization state, so that the third linearly polarized light beam is polarized into a fifth linearly polarized light beam; a polarization state of the fourth linearly polarized light beam changes from the S polarization state to the P polarization state, so that the fourth linearly polarized light beam is polarized into a sixth linearly polarized light beam. The fifth linearly polarized light beam passes through the second polarization splitter surface 21 or the third polarization splitter surface 22, and the sixth linearly polarized light beam is reflected by the second polarization splitter surface 21 and/or the third polarization splitter surface 22, so that the fifth linearly polarized light beam and the sixth linearly polarized light beam are combined into the second combined light beam at the second polarization beam splitter member 20 for being output.

Specifically, the first polarization adjustment member 30 includes a Faraday rotator 31 and a first half-wave plate 32, and the Faraday rotator 31 and the first half-wave plate 32 can respectively rotate a polarization direction of a linearly polarized light beam by a certain angle. For example, the first half-wave plate 32 is configured to rotate leftward a linearly polarized light beam by a specific angle, and the Faraday rotator 31 has opposite rotation angles for two linearly polarized light beams that transmit along opposite directions. In one example, the Faraday rotator 31 rotates rightward by a specific angle a linearly polarized light beam that transmits from left to right along the first direction, and rotates leftward by a specific angle a linearly polarized light beam that transmits oppositely (i.e., from right to left along the first direction). By the cooperation and arrangement of the Faraday rotator 31 and the first half-wave plate 32, the polarization states of the first and second linearly polarized light beams that pass through the Faraday rotator 31 and the first half-wave plate 32 are not changed, and the polarization states of the third and fourth linearly polarized light beams that pass through the Faraday rotator 31 and the first half-wave plate 32 in an opposite direction are changed.

It should be noted that, specific positions of the Faraday rotator 31 and the first half-wave plate 32 are not limited in the present disclosure. For the sake of describing the principle of the aforementioned adjustment that the first polarization adjustment member 30 performed on polarization states of linearly polarized light beams, the positions of the Faraday rotator 31 and the first half-wave plate 32 are taken as an example to describe principle of adjusting polarization states.

Specifically, in one embodiment, the Faraday rotator 31 can be disposed to be near one side of the second polarization beam splitter member 20, and the first half-wave plate 32 can be disposed between the Faraday rotator 31 and the first polarization beam splitter member 10.

The first linearly polarized light beam that enters through the second polarization beam splitter member 20 to travel to the first polarization adjustment member 30 sequentially passes through the Faraday rotator 31 and the first half-wave plate 32. That is, the first linearly polarized light beam passes through the Faraday rotator 31 from left to right along the first direction, and the Faraday rotator 31 rotates a polarization direction of the first linearly polarized light beam rightward by 45°. The first linearly polarized light beam that is rotated rightward by 45° passes through the first half-wave plate 32 from left to right along the first direction, and the first half-wave plate 32 further rotates the polarization direction of the first linearly polarized light beam that is rotated rightward by 45° leftward by 45°, so that the polarization state of the first linearly polarized light beam remains the same before and after the first linearly polarized light beam passes through the first polarization adjustment member 30. Similarly, the polarization state of the second linearly polarized light beam that enters through the second polarization beam splitter member 20 to travel to the first polarization adjustment member 30 remains the same after the second linearly polarized light beam sequentially passes through the Faraday rotator 31 and the first half-wave plate 32.

The third linearly polarized light beam that passes through the first polarization splitter surface 11 to travel to the first polarization adjustment member 30 sequentially passes through the first half-wave plate 32 and the Faraday rotator 31 to change the polarization state thereof. That is, the third linearly polarized light beam passes through the first half-wave plate 32 from right to left along the first direction, and the first half-wave plate 32 rotates a polarization direction of the third linearly polarized light beam leftward by 45°. The third linearly polarized light beam that is rotated leftward by 45° passes through the Faraday rotator 31 from right to left along the first direction, and the Faraday rotator 31 further rotates the polarization direction of the third linearly polarized light beam that is rotated leftward by 45° leftward by 45°. Therefore, the third linearly polarized light beam having the P polarization state passes through the first polarization adjustment member 30 to have the polarization direction thereof to be rotated leftward by 90° such that the polarization state of the third linearly polarized light beam is changed, and the third linearly polarized light beam is polarized into the fifth linearly polarized light beam having the S polarization state. Similarly, the fourth linearly polarized light beam that is reflected by the first reflection surface 12 to the first polarization adjustment member 30 sequentially passes through the first half-wave plate 32 and the Faraday rotator 31. Therefore, the polarization direction of the fourth linearly polarized light beam is rotated leftward by 90° such that the polarization state of the fourth linearly polarized light beam is changed, and the fourth linearly polarized light beam is polarized into the sixth linearly polarized light beam having the P polarization state.

Naturally, in other embodiments, a direction in which the Faraday rotator 31 and the first half-wave plate 32 rotate the polarization directions of the light beams can be adjusted, so that the third linearly polarized light beam and the fourth linearly polarized light beam can have the polarization states thereof changed by respectively passing through the first polarization adjustment member 30 and having the polarization directions thereof rotated rightward by 90°. Principle of rotation herein is the same as the aforementioned third linearly polarized light beam and the fourth linearly polarized light beam respectively passing through the first polarization adjustment member 30 and having the polarization directions thereof rotate leftward by 90°, and is not reiterated herein.

Furthermore, according to the aforementioned embodiments, the positions of the Faraday rotator 31 and the first half-wave plate 32 may be interchanged. The principle of rotation on each linearly polarized light beam in this manner is similar to the principle of rotation on each linearly polarized light beam in the aforementioned embodiments, and will not be reiterated herein.

According to the aforementioned embodiments, specific structures of the first polarization beam splitter member 10 and the second polarization beam splitter member 20 are described in further detail as follows, but the present disclosure is not limited to the embodiments as follows.

Specifically, as shown in FIG. 1 and FIG. 2, in certain embodiments, the first polarization splitter surface 11 and the third polarization splitter surface 22 are located on a same optical axis, the first reflection surface 12 and the second polarization splitter surface 21 are located on another optical axis, and the first polarization adjustment member 30 is located between the first polarization splitter surface 11 and the third polarization splitter surface 22 and between the first reflection surface 12 and the second polarization splitter surface 21.

The first linearly polarized light beam that enters through the first receiving optical port 201 sequentially passes through the third polarization splitter surface 22 and the first polarization adjustment member 30 and travels to the first polarization splitter surface 11. The second linearly polarized light beam that enters through the second receiving optical port 202 sequentially is reflected by the second polarization splitter surface 21, passes through the first polarization adjustment member 30, and is reflected by the first reflection surface 12 to travel to the first polarization splitter surface 11. The first linearly polarized light beam and the second linearly polarized light beam are combined into the first combined light beam at the first polarization splitter surface 11, so as to be output by the common optical port 101.

The compound optical signal that enters through the common optical port 101 is split into the third linearly polarized light beam and the fourth linearly polarized light beam at the first polarization splitter surface 11. The third linearly polarized light beam passes through the first polarization splitter surface 11 to travel to the first polarization adjustment member 30 to change a polarization state thereof, the third linearly polarized light beam is polarized into a fifth linearly polarized light beam, and the fifth linearly polarized light beam is reflected by the third polarization splitter surface 22 to travel to the second polarization splitter surface 21. The fourth linearly polarized light beam is sequentially reflected by the first polarization splitter surface 11 and the first reflection surface 12 to travel to the first polarization adjustment member 30 to change a polarization state thereof, the fourth linearly polarized light beam is polarized into a sixth linearly polarized light beam, and the sixth linearly polarized light beam travels to the second polarization splitter surface 21. The fifth linearly polarized light beam and the sixth linearly polarized light beam are combined into the second combined light beam at the second polarization splitter surface 21, so as to be output from the emittance optical port 203.

Furthermore, an arrangement of the receiving optical ports and the emittance optical port 203 on the second polarization beam splitter member 20 is not limited. For example, in certain embodiments, the second polarization beam splitter member 20 includes the second prism 204, the third prism 205, and a fourth prism 206 that are stacked along the second direction, the second polarization splitter surface 21 is located between the second prism 204 and the third prism 205, and the third polarization splitter surface 22 is located between the third prism 205 and the fourth prism 206. The first receiving optical port 201 is located on one side of the fourth prism 206, the second receiving optical port 202 is located on one side of the second prism 204, and the emittance optical port 203 is located on one side of the third prism 205.

More preferably, as shown in FIG. 1 and FIG. 2, the first receiving optical port 201 is disposed along the first direction and opposite to the third polarization splitter surface 22, and the emittance optical port 203 is disposed along the first direction and opposite to the second polarization splitter surface 21. The second polarization beam splitter member 20 further includes a third reflection surface 24, the third reflection surface 24 is disposed on a surface of the second prism 204 that faces away from the second polarization splitter surface 21, the second receiving optical port 202 is disposed along the first direction and opposite to the third reflection surface 24, and the third reflection surface 24 is configured to reflect the second linearly polarized light beam that enters through the receiving optical ports to the second polarization splitter surface 21.

Figure 3:
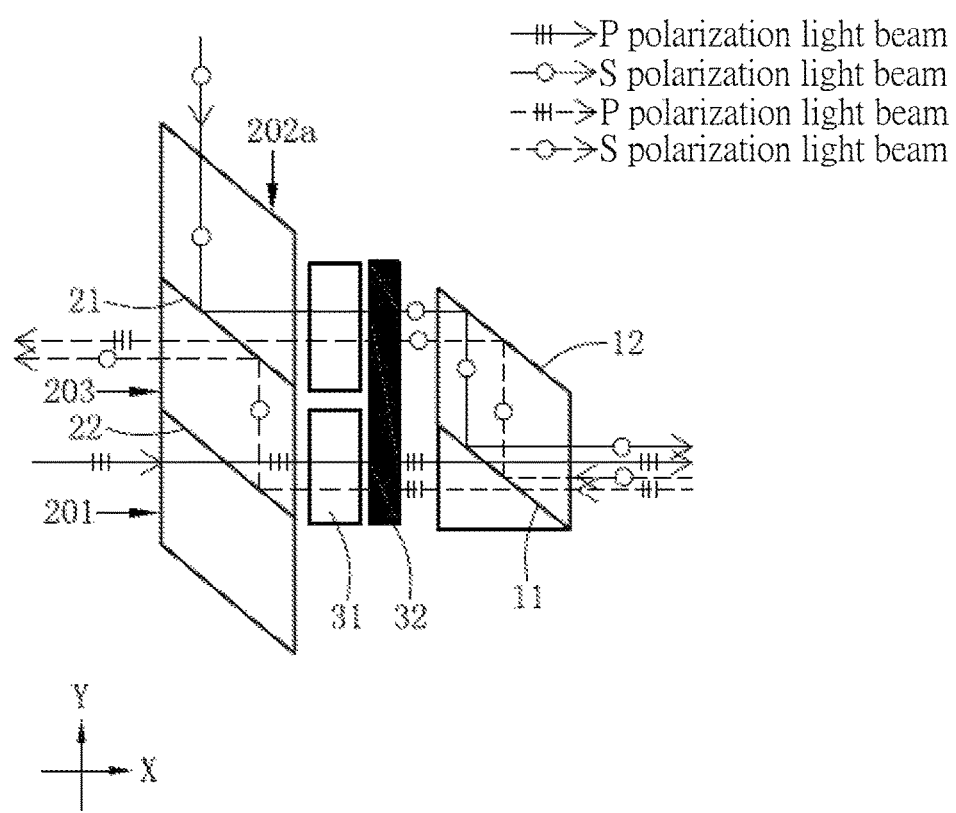
FIG. 3 is another schematic view of light beam transmission of the optical circulator of FIG. 1 in one embodiment.

Naturally, as shown in FIG. 3, the first receiving optical port 201 in other embodiments is disposed along the first direction and opposite to the third polarization splitter surface 22, the emittance optical port 203 is disposed along the first direction and opposite to the second polarization splitter surface 21, and the second receiving optical port 202 can be disposed along the second direction and opposite to the second polarization splitter surface 21, such that the third reflection surface 24 can be omitted.

Figure 4:
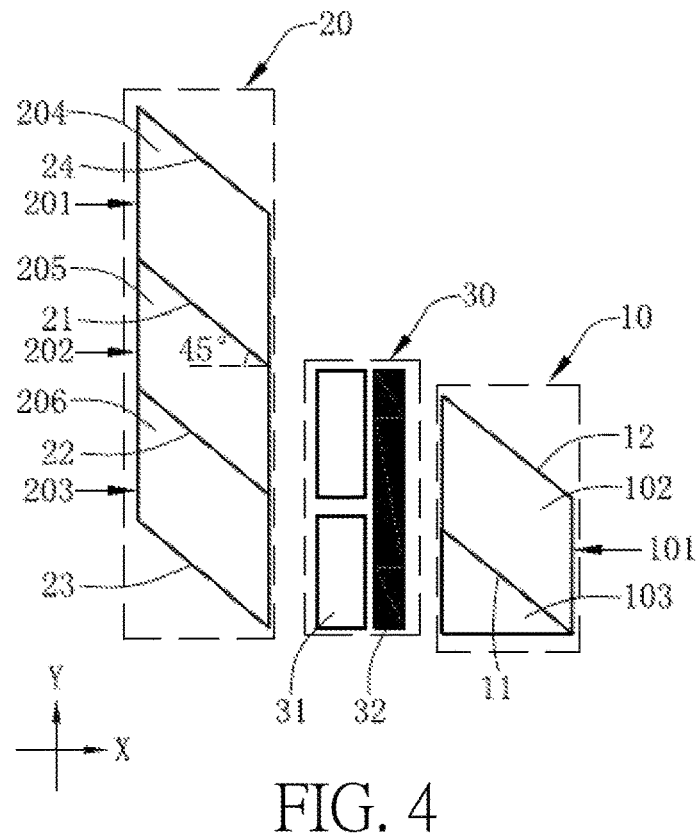
FIG. 4 is a schematic view of the structure of the optical circulator according to another embodiment of the present disclosure.
Figure 5:
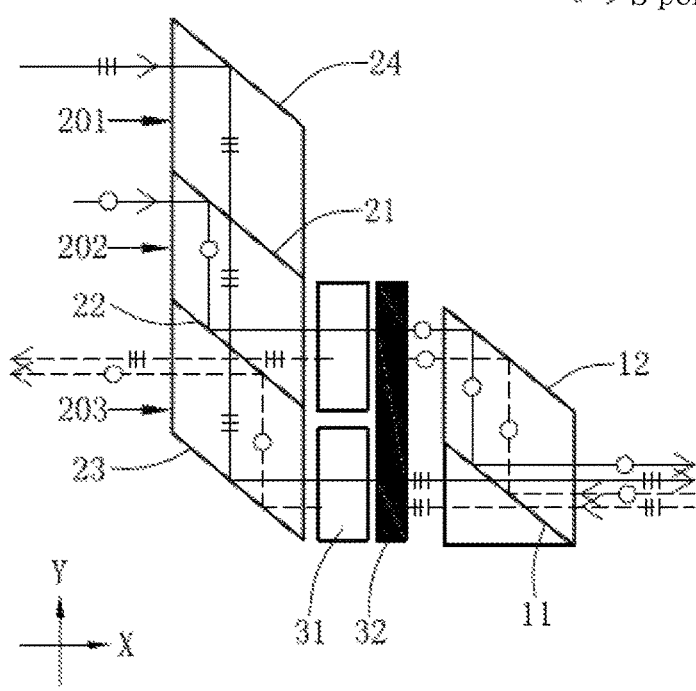
FIG. 5 is a schematic view of light beam transmission of the optical circulator of FIG. 4 in one embodiment.

As shown in FIG. 4 and FIG. 5, in other embodiments, the second polarization beam splitter member 20 includes the second prism 204, the third prism 205, and the fourth prism 206 that are stacked along the second direction, the second polarization splitter surface 21 is disposed between the second prism 204 and the third prism 205, the third polarization splitter surface 22 is disposed between the third prism 205 and the fourth prism 206, and a second reflection surface 23 is disposed on a surface of the fourth prism 206 facing away from the third polarization splitter surface 22. The second polarization splitter surface 21, the third polarization splitter surface 22, and the second reflection surface 23 are disposed to be parallel to each other.

The third polarization splitter surface 22 and the first reflection surface 12 are located on a same optical axis, the second reflection surface 23 and the first polarization splitter surface 11 are located on another optical axis, and the first polarization adjustment member 30 is located between the third polarization splitter surface 22 and the first reflection surface 12 and between the second reflection surface 23 and the first polarization splitter surface 11.

The first linearly polarized light beam that enters through the first receiving optical port 201 sequentially passes through the second polarization splitter surface 21 and the third polarization splitter surface 22, is reflected by the second reflection surface 23, and passes through the first polarization adjustment member 30 to travel to the first polarization splitter surface 11. The second linearly polarized light beam that enters through the second receiving optical port 202 is sequentially reflected by the second polarization splitter surface 21 and the third polarization splitter surface 22, passes through the first polarization adjustment member 30, and is reflected by the first reflection surface 12 to travel to the first polarization splitter surface 11. The first linearly polarized light beam and the second linearly polarized light beam are combined into the first combined light beam at the first polarization splitter surface 11, so as to be output from the common optical port 101.

The compound optical signal that enters through the common optical port 101 is split into the third linearly polarized light beam and the fourth linearly polarized light beam at the first polarization splitter surface 11. The third linearly polarized light beam travels to the first polarization adjustment member 30 to change the polarization state thereof, the third linearly polarized light beam is polarized into the fifth linearly polarized light beam, and the fifth linearly polarized light beam is reflected by the second reflection surface 23 to travel to the third polarization splitter surface 22. The fourth linearly polarized light beam is sequentially reflected by the first polarization splitter surface 11 and the first reflection surface 12 to travel to the first polarization adjustment member 30 to change the polarization state thereof, the fourth linearly polarized light beam is polarized into the sixth linearly polarized light beam, and the sixth linearly polarized light beam travels to the third polarization splitter surface 22. The fifth linearly polarized light beam and the sixth linearly polarized light beam are combined into the second combined light beam at the third polarization splitter surface 22, so as to be output from the emittance optical port 203.

Furthermore, the arrangement of the receiving optical ports and the emittance optical port 203 on the second polarization beam splitter member 20 is not limited in the present disclosure. For example, in certain embodiments, the first receiving optical port 201 is located on one side of the second prism 204, the second receiving optical port 202 is located on one side of the third prism 205, and the emittance optical port 203 is located on one side of the fourth prism 206.

More preferably, as shown in FIG. 4 and FIG. 5, in certain embodiments, the second polarization beam splitter member 20 further includes the third reflection surface 24. The third reflection surface 24 is disposed on a surface of the second prism 204 that faces away from the second polarization splitter surface 21, the first receiving optical port 201 is disposed along the first direction and opposite to the third reflection surface 24, and the third reflection surface 24 is configured to reflect the incoming first linearly polarized light beam to the second polarization splitter surface 21. Furthermore, the second receiving optical port 202 is disposed along the first direction and opposite to the second polarization splitter surface 21, and the emittance optical port 203 can be disposed along the first direction and opposite to the third polarization splitter surface 22.

Figure 6:
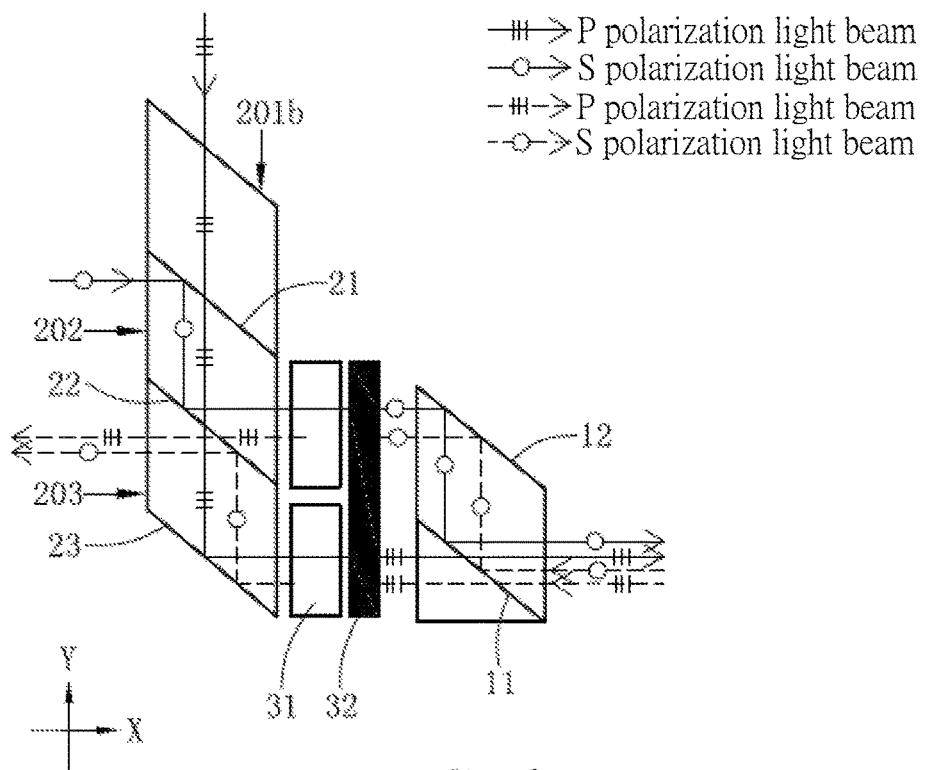
FIG. 6 is another schematic view of light beam transmission of the optical circulator of FIG. 4 in one embodiment.

Naturally, as shown in FIG. 6, in other embodiments, a first receiving optical port 201b is disposed along the second direction and opposite to the second polarization splitter surface 21, the second receiving optical port 202 is disposed along the first direction and opposite to the second polarization splitter surface 21, and the emittance optical port 203 is disposed along the first direction and opposite to the third polarization splitter surface 22, such that the third reflection surface 24 can be omitted.

Figure 7:
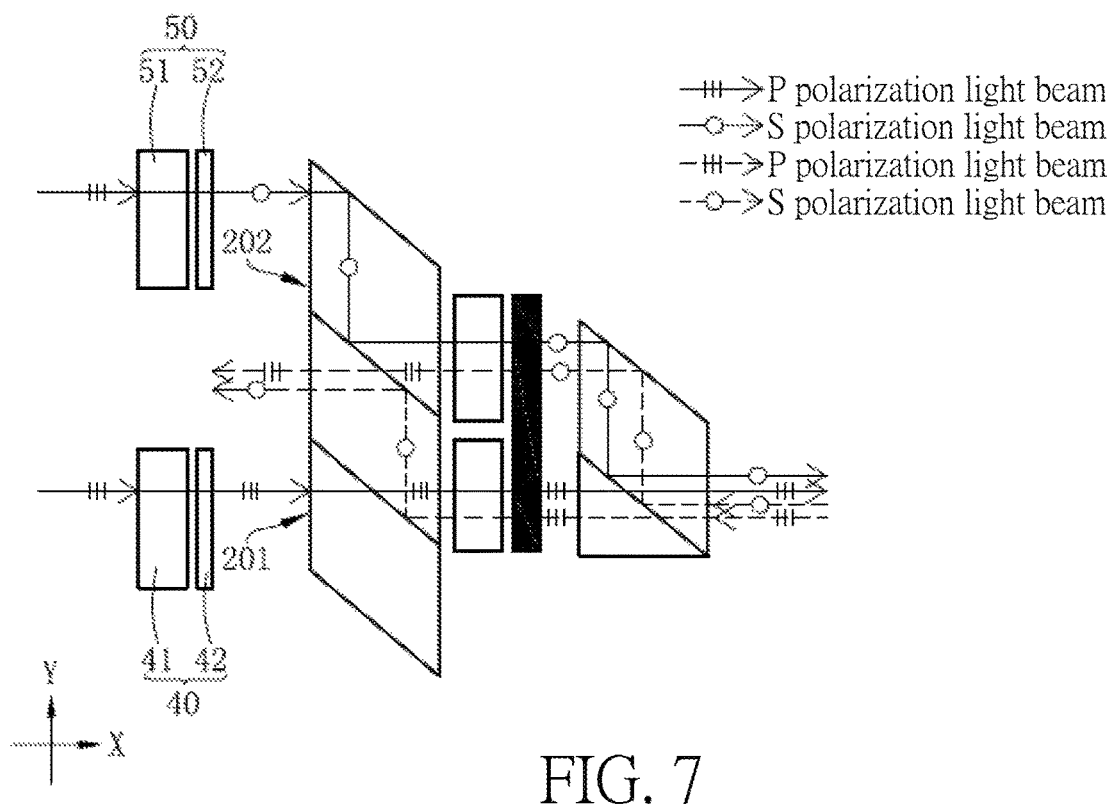
FIG. 7 is a schematic view of the structures of second and third polarization adjustment members in one implementation of the optical circulator of FIG. 1.

As shown in FIG. 7, in certain embodiments, the optical circulator 100 further includes a second polarization adjustment member 40 and a third polarization adjustment member 50 that are respectively located on the two receiving optical ports, and the second polarization adjustment member 40 and the third polarization adjustment member 50 are configured to adjust light beams that enter the two receiving optical ports into two linearly polarized light beams having polarization directions that are perpendicular to each other.

It should be noted that, the polarization states of incident light beams directly affect the structural arrangement of the second polarization adjustment member 40 and the third polarization adjustment member 50. For the sake of clarity, certain embodiments are provided as follows for describing.

However, it should be noted that, a specific structural arrangement of the second polarization adjustment member 40 and the third polarization adjustment member 50 can include, but are not limited to, the embodiments as provided in the following descriptions.

Specifically, the second polarization adjustment member 40 is disposed along the first direction and opposite to the first receiving optical port 201. The second polarization adjustment member 40 is configured to receive the incident light beams having the P polarization state or the S polarization state, and the second polarization adjustment member 40 then outputs the light beam having the P polarization state as an emitted light beam (i.e., the first linearly polarized light beam) toward the first receiving optical port 201 and prevents light beams that return in an opposite direction to pass therethrough.

Specifically, if the incident light beam that is received has the P polarization state, a rotation process is required for rotating the polarization direction of the incident light beam by 0°. At this time, the rotation process can be performed on the polarization direction of the incident light beam for at least two times. In the plurality of rotation processes, at least two of the rotation processes have opposite directions (i.e., rotation directions), a sum of rotation angles of the plurality of rotation processes is 0°, and the second polarization adjustment member 40 outputs the light beam having the P polarization state obtained by performing the rotation processes on the incident light beam as the first linearly polarized light beam. For example, in one of the embodiments, the second polarization adjustment member 40 includes a first optical isolator 41 and a second half-wave plate 42, a light beam having the P polarization state is rotated rightward by 45° when passing through the first optical isolator 41, the light beam having the P polarization state and being rotated rightward by 45° is then rotated leftward by 45° when passing through the second half-wave plate 42. That is, a sum of the rotation angles of the incident light beam that has the P polarization state and transmits from left to right along the first direction sequentially through the first optical isolator 41 and the second half-wave plate 42 is 0°.

On the other hand, if the incident light beam that is received has the S polarization state, the rotation process is required for rotating the polarization direction of the incident light beam by 90°. At this time, the rotation process can be performed on the polarization direction of the incident light beam for at least two times. In the plurality of rotation processes, at least two of the rotation processes have opposite directions (i.e., rotation directions), and a sum of rotation angles of the plurality of rotation processes is 90°, so that the incident light beam that has the S polarization state is polarized into a light beam having the P polarization state. Furthermore, the second polarization adjustment member 40 outputs the light beam having the P polarization state obtained by performing the rotation processes on the incident light beam as the first linearly polarized light beam. For example, in one of the embodiments, the second polarization adjustment member 40 includes the first optical isolator 41 and the second half-wave plate 42, a light beam having the P polarization state is rotated rightward by 45° when passing through the first optical isolator 41, the light beam having the P polarization state and being rotated rightward by 45° is then rotated rightward by 45° when passing through the second half-wave plate 42. That is, a sum of the rotation angles of the incident light beam that has the P polarization state and transmits from left to right along the first direction sequentially through the first optical isolator 41 and the second half-wave plate 42 is 90°.

In certain embodiments, the third polarization adjustment member 50 is disposed opposite to the second receiving optical port 202, and configured to receive the incident light beams having the P polarization state or the S polarization state, and then output the light beam having the S polarization state as an emitted light beam (i.e., the second linearly polarized light beam) toward the second receiving optical port 202. It should be noted that, the third polarization adjustment member 50 includes a second optical isolator 51 and a third half-wave plate 52, and the incident light beam is polarized into a light beam having the S polarization state after passing through the second optical isolator 51 and the third half-wave plate 52. The principle adopted by the third polarization adjustment member 50 to rotate the light beams is similar to the principle adopted by the second polarization adjustment member 40 to rotate the light beams, and will not be reiterated in detail herein.

Figure 8:
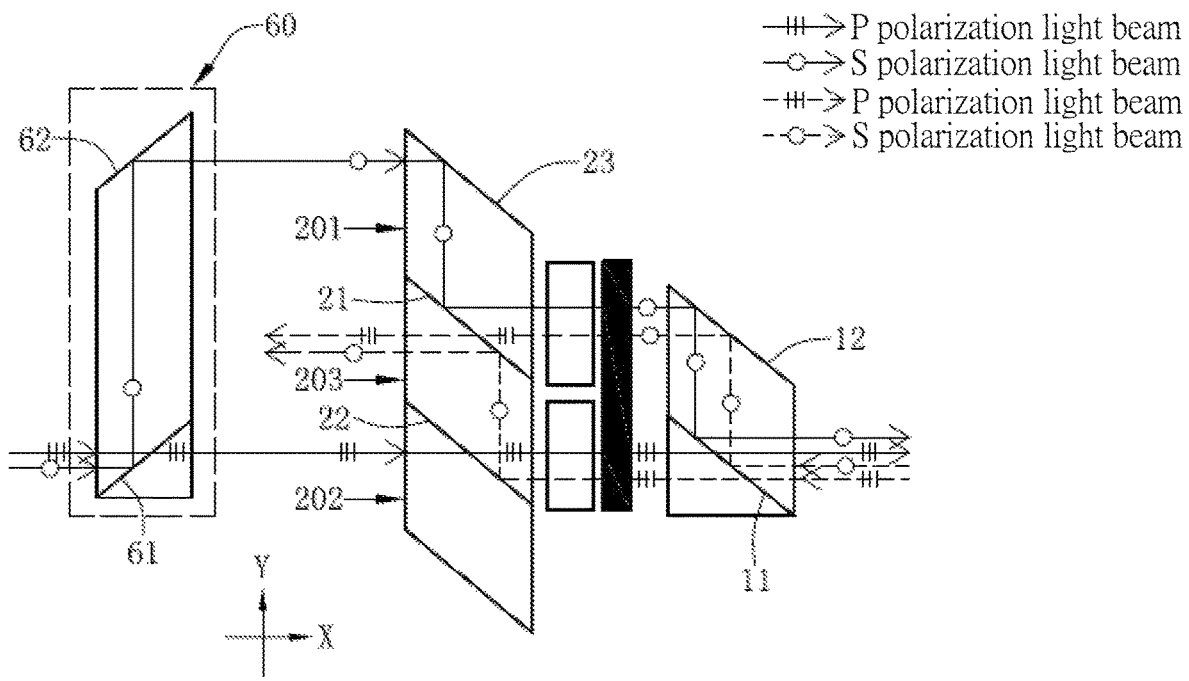
FIG. 8 is a schematic view of a third polarization beam splitter member of the optical circulator according to one embodiment of the present disclosure.

As shown in FIG. 8, in certain embodiments, the optical circulator 100 further includes a third polarization beam splitter member 60. The third polarization beam splitter member 60 is disposed in front of the two receiving optical ports, and the third polarization beam splitter member 60 is configured to split an incident light beam having polarization states into a P polarization light beam and an S polarization light beam and respectively transmit the P polarization light beam and the S polarization light beam to the two receiving optical ports of the second polarization beam splitter member 20.

In one embodiment, the third polarization beam splitter member 60 includes a fourth polarization splitter surface 61 and a fourth reflection surface 62, the fourth reflection surface 62 can be disposed along the first direction and opposite to the third reflection surface 24, and the fourth polarization splitter surface 61 can be disposed along the first direction and opposite to the third polarization splitter surface 22. The incident light beam is split into a P polarization light beam and an S polarization light beam at the fourth polarization splitter surface 61. The P polarization light beam passes through the fourth polarization splitter surface 61 and becomes the first linearly polarized light beam to travel to the third polarization splitter surface 22 through the first receiving optical port 201. The S polarization light beam is sequentially reflected by the fourth polarization splitter surface 61 and the fourth reflection surface 62 and becomes the second linearly polarized light beam to travel to the third reflection surface 24 after passing through the second receiving optical port 202, and the second linearly polarized light beam is then reflected by the third reflection surface 24 to travel to the second polarization splitter surface 21.

Figure 9:
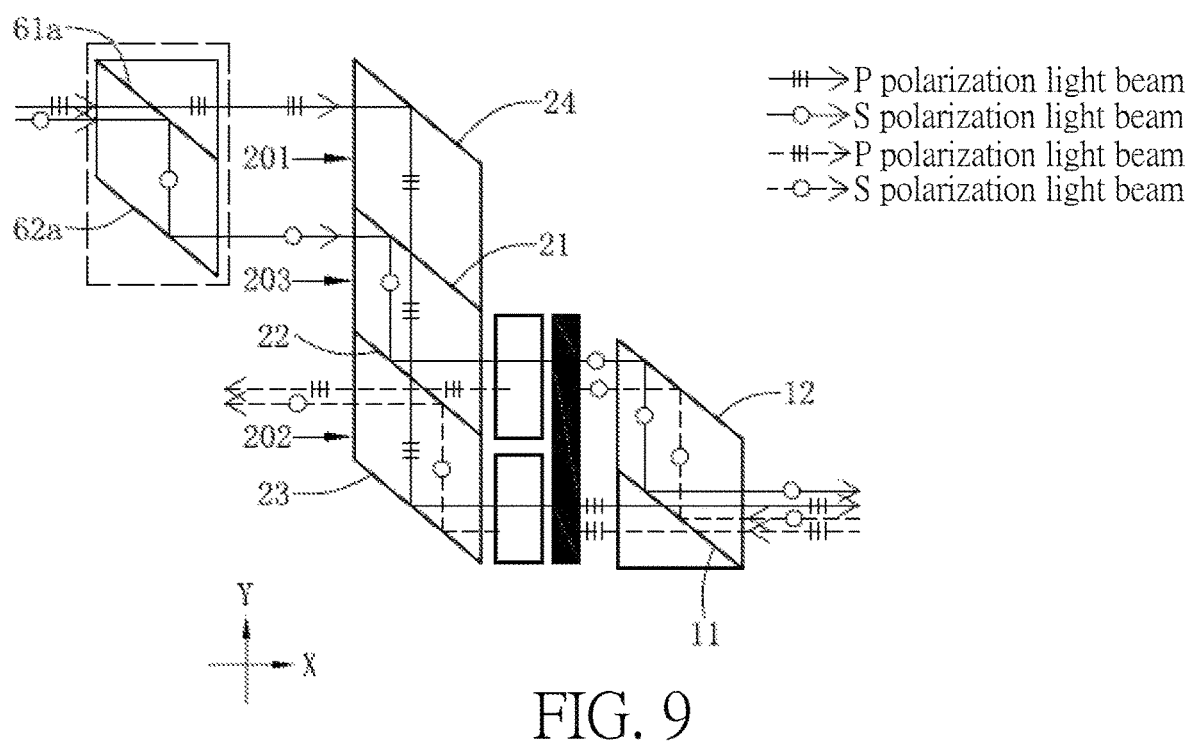
FIG. 9 is another schematic view of a third polarization beam splitter member of the optical circulator according to one embodiment of the present disclosure.

Naturally, as shown in FIG. 9, the third polarization beam splitter member 60 in another embodiment includes a fourth polarization splitter surface 61a and a fourth reflection surface 62a, the fourth polarization splitter surface 61a is disposed along the first direction and opposite to the third reflection surface 24, and the fourth reflection surface 62a is disposed along the first direction and opposite to the second polarization splitter surface 21. The incident light beam is split into a P polarization light beam and an S polarization light beam at the fourth polarization splitter surface 61a. The P polarization light beam passes through the fourth polarization splitter surface 61a and becomes the first linearly polarized light beam to travel to the third reflection surface 24 through the first receiving optical port 201, and the first linearly polarized light beam is then reflected by the third reflection surface 24 to the second polarization splitter surface 21. The S polarization light beam is sequentially reflected by the fourth polarization splitter surface 61a and the fourth reflection surface 62a and becomes the second linearly polarized light beam to travel to the second polarization splitter surface 21 after passing through the second receiving optical port 202.

As shown in FIG. 1 to FIG. 2, and FIG. 10 to FIG. 11, the present disclosure further provides an optical module 200. The optical module 200 includes the abovementioned optical circulator 100, at least two emitting members 70, a receiving member 80, and an optical interface 90. The emitting members 70 are respectively disposed opposite to the at least two receiving optical ports of the optical circulator 100, the receiving member 80 is disposed opposite to the emittance optical port 203, and the optical interface 90 is disposed opposite to the common optical port 101.

Light beams respectively emitted by each of the emitting members 70 respectively travel to a corresponding one of the receiving optical ports disposed opposite to each of the emitting members 70, and an optical isolator 71 and a half-wave plate 72 are sequentially disposed between each of the emitting members 70 and the corresponding one of the receiving optical ports of the optical circulator 100. The optical isolator 71 and the half-wave plate 72 jointly form a polarization adjustment member that is disposed opposite to a corresponding one of the receiving optical ports. Before a plurality ones of the incident light beam travel to the receiving optical ports, the polarization adjustment member respectively polarizes a part of the plurality of incident light beams into the first linearly polarized light beam, and another part of the plurality of incident light beams into the second linearly polarized light beam. The first linearly polarized light beam and the second linearly polarized light beam are combined by the optical circulator 100 into the first combined light beam that is output to the optical interface 90, and the first combined light beam is output to external optical communication devices by the optical interface 90.

Each of the emitting members 70 outputs one of the plurality of incident light beams toward the second polarization beam splitter member 20. Before the plurality of incident light beams travel to the second polarization beam splitter member 20, a part of the plurality of incident light beams is polarized into the first linearly polarized light beam, and another part of the plurality of incident light beams is polarized into the second linearly polarized light beam.

The optical interface 90 is further configured to receive an external compound optical signal and transmit the external compound optical signal that is received to the common optical port 101 of the optical circulator 100.

The receiving member 80 is configured to receive the second combined light beam emitted from the emittance optical port 203 of the optical circulator 100.

In the optical module 200 as mentioned above, by adopting the aforementioned optical circulator 100, a use rate of the optical fibers can be increased, and an amount of the optical fibers used can be decreased so as to save optical fibers; furthermore, due to the optical circulator 100 having a compact and simple structure, it is conducive to miniaturization of the optical modules 200 and improvement of integration.

Figure 10:
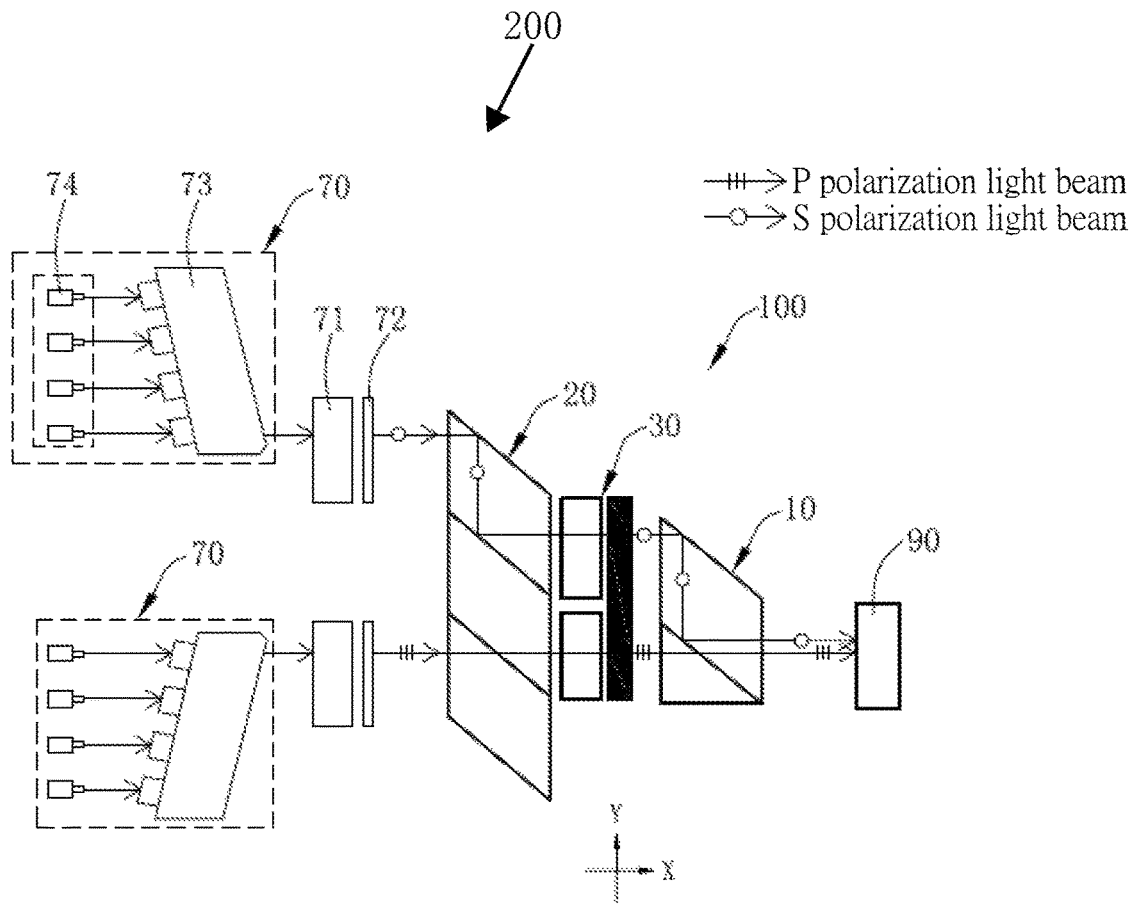
FIG. 10 is a schematic view of the structure of an assembly of emitting members, the optical circulator, and an optical interface in an optical module according to one embodiment of the present disclosure.
Figure 11:
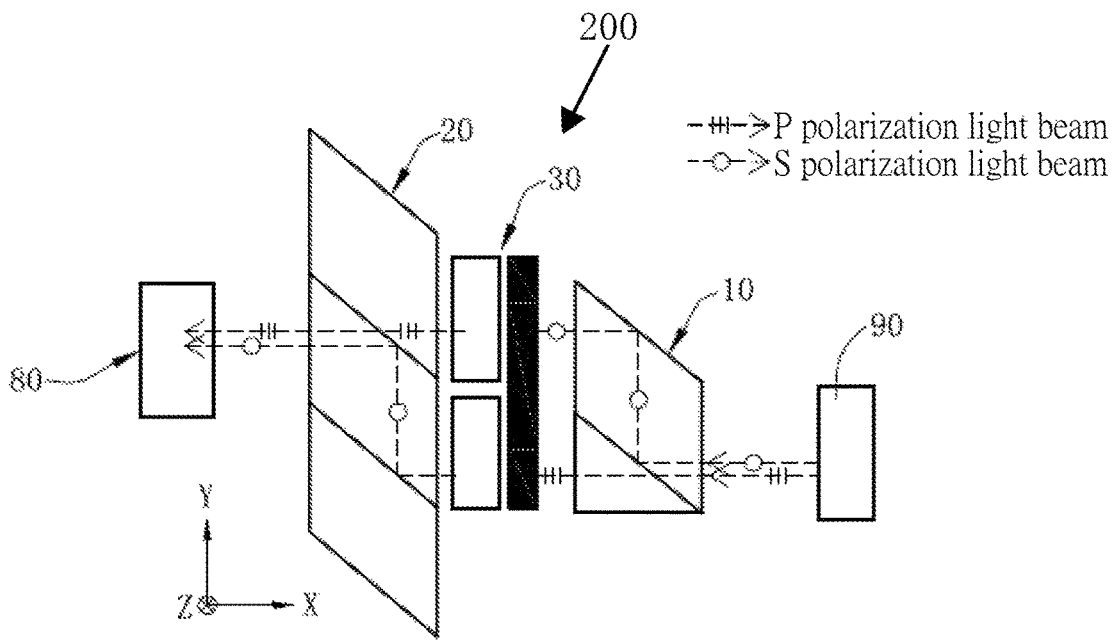
FIG. 11 is a schematic view of the structure of an assembly of a receiving member, the optical circulator, and the optical interface in the optical module according to one embodiment of the present disclosure.
Figure 12:
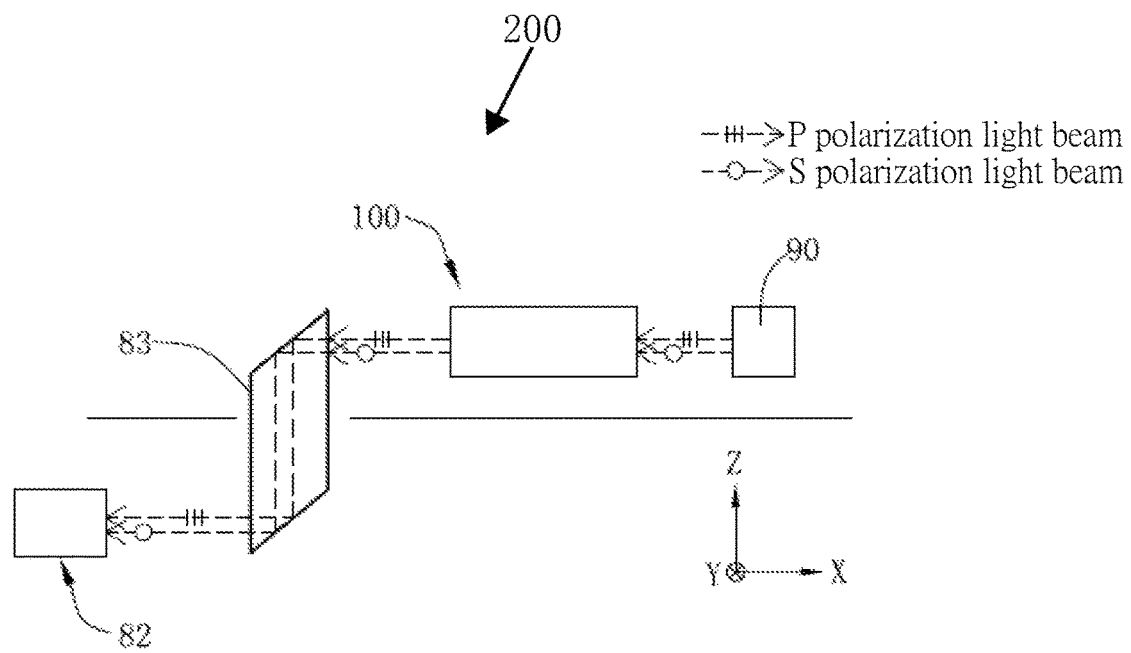
FIG. 12 is a schematic view of the structure of an assembly of the receiving member, the optical circulator, and the optical interface in the optical module according to one embodiment of the present disclosure in another perspective.
Figure 13:
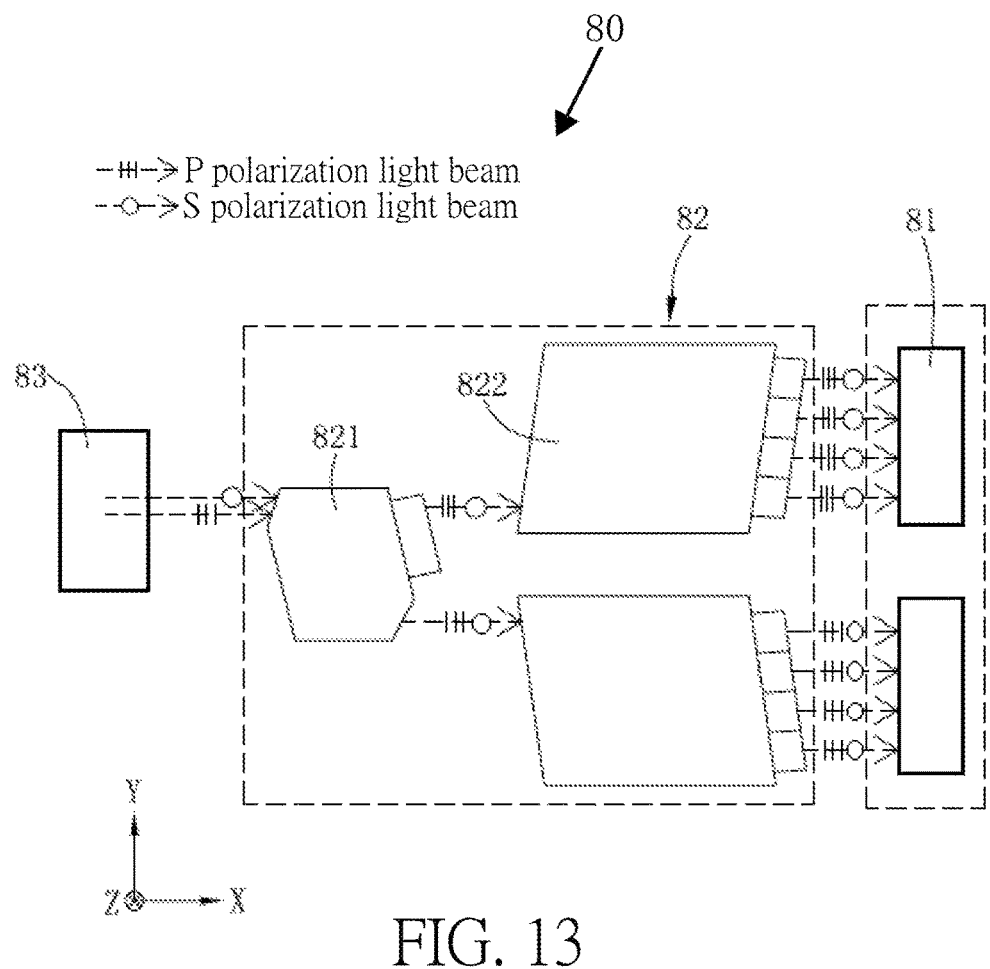
FIG. 13 is a schematic view of the structure of the receiving member in the optical module according to one embodiment of the present disclosure.

As shown in FIG. 1, FIG. 2, and FIG. 10, in certain embodiments, each of the emitting members 70 includes a wavelength division multiplexer 73 and a plurality of optical emitting units 74, and the plurality of optical emitting units 74 of each of the emitting members 70 are laser light sources that are used to emit P polarization light beams or S polarization light beams. Light beams emitted by each of the plurality of optical emitting units 74 are combined by the wavelength division multiplexer 73 into one combined light beam that passes through the optical isolator and the half-wave plate to travel to the second polarization beam splitter member 20 of the optical circulator 100.

Specifically, in this embodiment, a quantity of the emitting members 70 is two, and each of the emitting members 70 includes one wavelength division multiplexer 73 and four optical emitting units 74. The one wavelength division multiplexer 73 receives four P polarization light beams or S polarization light beams having different wavelengths from the corresponding four optical emitting units 74, and optically combines the four P polarization light beams or S polarization light beams into an incident light beam. The incident light beam passes through the optical isolator 71 and the half-wave plate 72 and travels to one of the receiving optical ports of the second polarization beam splitter member 20.

As shown in FIG. 1 to FIG. 2, and FIG. 11 to FIG. 13, in certain embodiments, the receiving member 80 includes a wavelength division demultiplexer 82 and a plurality of optical receiving units 81. The optical receiving units 81 can be, but are not limited to be laser receivers (such as photodiodes). The wavelength division demultiplexer 82 is configured to demultiplex the second combined light beam emitted from the emittance optical port 203 to obtain a plurality of demultiplexed light beams and transmit the plurality of demultiplexed light beams to the plurality of optical receiving units 81 that are disposed opposite to the wavelength division demultiplexer 82.

It is worth noting that, a relative positioning of the receiving member 80 and the optical circulator 100 is not limited in the present disclosure. For example, in the present disclosure, a third direction (i.e., a z-axis direction) is a direction that is perpendicular to the first direction (i.e., the x-axis direction) and the second direction (i.e., the y-axis direction), and the optical module 200 further includes a periscope 83 that extends along the third direction, and the emittance optical port 203 of the optical circulator 100 is disposed opposite to a reflection surface of the periscope 83. In this embodiment, the emitting members 70, the optical circulator 100, and the optical interface 90 are disposed on one side of the optical module 200, and the receiving member 80 is located on another side of the optical module 200. The second combined light beam that is output from the emittance optical port 203 of the optical circulator 100 is guided though the periscope 83 to the side of the optical module 200 which the receiving member 80 is located on, so that the emitting members 70 and the receiving member 80 can be respectively disposed on two opposite sides of the optical module 200 along the third direction. Therefore, the emitting members 70 and the receiving member 80 can be prevented from being disposed on a same side of the optical module 200, so as to facilitate the reduction of an overall volume of the optical module 200.

Furthermore, in one of the embodiments, the wavelength division demultiplexer 82 includes a one-to-two wavelength division demultiplexer 821 and two one-to-four wavelength division demultiplexers 822, the one-to-two wavelength division demultiplexer 821 is located between the periscope 83 and the two one-to-four wavelength division demultiplexers 822, and each of the two one-to-four wavelength division demultiplexers 822 is disposed opposite to four of the optical receiving units 81.

The periscope 83 reflects the second combined light beam to the one-to-two wavelength division demultiplexer 821, and the one-to-two wavelength division demultiplexer 821 splits the second combined light beam to obtain a second compound optical signal and a third compound optical signal. The second compound optical signal travels to one of the one-to-four wavelength division demultiplexers 822, and the one-to-four wavelength division demultiplexer 822 demultiplexes the second compound optical signal so that the second compound optical signal is split into four fifth linearly polarized light beams that have different wavelengths. The four fifth linearly polarized light beams after splitting are then respectively transmitted to four of the optical receiving units 81 that are disposed corresponding to the one-to-four wavelength division demultiplexer 822. Furthermore, the third compound optical signal is transmitted to the another one of the one-to-four wavelength division demultiplexers 822, and the another one-to-four wavelength division demultiplexer 822 demultiplexes the third compound optical signal, so that the third compound optical signal is split into four sixth linearly polarized light beams that have different wavelengths. The four sixth linearly polarized light beams after splitting are then respectively transmitted to another four of the optical receiving units 81 that are disposed corresponding to the another one-to-four wavelength division demultiplexer 822.

Naturally, in other embodiments of the present disclosure, the wavelength division demultiplexer can be a one-to-eight wavelength division demultiplexer (not shown in the figures). The one-to-eight wavelength division demultiplexer is disposed corresponding to eight of the optical receiving units 81, and the one-to-eight wavelength division demultiplexer demultiplexes the second combined light beam into four fifth linearly polarized light beams that have different wavelengths and four sixth linearly polarized light beams that have different wavelengths. The one-to-eight wavelength division demultiplexer then transmits the four fifth linearly polarized light beams to four of the eight optical receiving units 81, and transmits the four sixth linearly polarized light beams to another four of the eight optical receiving units 81.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical circulator, comprising:
a first polarization beam splitter member having a common optical port;
a second polarization beam splitter member having an emittance optical port and at least two receiving optical ports; and
a first polarization adjustment member located between the first polarization beam splitter member and the second polarization beam splitter member and being configured to uni-directionally adjust polarization states of light beams;
wherein the at least two receiving optical ports respectively receive two linearly polarized light beams having different polarization states, and the two linearly polarized light beams include a first linearly polarized light beam and a second linearly polarized light beam; wherein the first linearly polarized light beam and the second linearly polarized light beam respectively pass through the second polarization beam splitter member, and then sequentially pass through the first polarization adjustment member and the first polarization beam splitter member to be combined into a first combined light beam for being output from the common optical port;
wherein the common optical port is configured to receive a compound optical signal, the compound optical signal passes through the first polarization beam splitter member to be split into another two linearly polarized light beams having different polarization states, and the another two linearly polarized light beams include a third linearly polarized light beam and a fourth linearly polarized light beam; wherein the third linearly polarized light beam and the fourth linearly polarized light beam pass through the first polarization adjustment member to interchange the polarization states thereof, and then pass through the second polarization beam splitter member to be combined into a second combined light beam for being output from the emittance optical port.

2. The optical circulator according to claim 1, wherein the first polarization beam splitter member includes a first polarization splitter surface and a first reflection surface, and the second polarization beam splitter member includes at least two polarization splitter surfaces that are a second polarization splitter surface and a third polarization splitter surface;
wherein the first polarization splitter surface, the second polarization splitter surface, and the third polarization splitter surface all allow one of the first linearly polarized light beam and the second linearly polarized light beam to transmit therethrough, and reflect another one of the first linearly polarized light beam and the second linearly polarized light beam;
wherein the first polarization adjustment member includes a Faraday rotator and a first half-wave plate, the first polarization adjustment member is configured to change the polarization states of the third linearly polarized light beam and the fourth linearly polarized light beam that are split by the first polarization beam splitter member, so that the polarization states of the third linearly polarized light beam and the fourth linearly polarized light beam are interchanged.

3. The optical circulator according to claim 2, wherein the first polarization beam splitter member, the first polarization adjustment member, and the second polarization beam splitter member are sequentially disposed along a first direction;
wherein the first polarization beam splitter member includes at least one first prism that has two surfaces that face away from each other, and the first polarization splitter surface and the first reflection surface are respectively disposed on the two surfaces that face away from each other of the at least one first prism;
wherein the second polarization beam splitter member includes at least two prisms that are stacked along a second direction, the two prisms are a second prism and a third prism, and the second direction is perpendicular to the first direction; wherein the second polarization splitter surface is disposed between the second prism and the third prism, and the third polarization splitter surface is disposed on a surface of the third prism facing away from the second prism.

4. The optical circulator according to claim 3, wherein the first polarization splitter surface and the third polarization splitter surface are located on a same optical axis, the first reflection surface and the second polarization splitter surface are located on another optical axis, and the first polarization adjustment member is located between the first polarization splitter surface and the third polarization splitter surface, and between the first reflection surface and the second polarization splitter surface;

wherein the first linearly polarized light beam that enters through the receiving optical ports sequentially passes through the third polarization splitter surface and the first polarization adjustment member and travels to the first polarization splitter surface; wherein the second linearly polarized light beam that enters through the receiving optical ports sequentially is reflected by the second polarization splitter surface, passes through the first polarization adjustment member, and is reflected by the first reflection surface to travel to the first polarization splitter surface; wherein the first linearly polarized light beam and the second linearly polarized light beam are combined into the first combined light beam at the first polarization splitter surface, so as to be output from the common optical port;

wherein the compound optical signal that enters through the common optical port is split into the third linearly polarized light beam and the fourth linearly polarized light beam at the first polarization splitter surface; wherein the third linearly polarized light beam passes through the first polarization splitter surface to travel to the first polarization adjustment member to change a polarization state thereof, the third linearly polarized light beam is polarized into a fifth linearly polarized light beam, and the fifth linearly polarized light beam is reflected by the third polarization splitter surface to travel to the second polarization splitter surface; wherein the fourth linearly polarized light beam is sequentially reflected by the first polarization splitter surface and the first reflection surface to travel to the first polarization adjustment member to change a polarization state thereof, the fourth linearly polarized light beam is polarized into a sixth linearly polarized light beam, and the sixth linearly polarized light beam travels to the second polarization splitter surface; wherein the fifth linearly polarized light beam and the sixth linearly polarized light beam are combined into the second combined light beam at the second polarization splitter surface, so as to be output from the emittance optical port.

5. The optical circulator according to claim 4, wherein the second polarization beam splitter member further includes a fourth prism, the fourth prism is stacked with the third prism along the second direction, and the third polarization splitter surface is located between the third prism and the fourth prism;

wherein the two receiving optical ports are respectively located on one side of the second prism and one side of the fourth prism, and the emittance optical port is located on one side of the third prism.

6. The optical circulator according to claim 3, wherein the second polarization beam splitter member further includes a fourth prism, the fourth prism is stacked with the third prism along the second direction, and the third polarization splitter surface is located between the third prism and the fourth prism; wherein a second reflection surface is disposed on a surface of the fourth prism facing away from the third polarization splitter surface;

wherein the third polarization splitter surface and the first reflection surface are located on a same optical axis, the second reflection surface and the first polarization splitter surface are located on another optical axis, and the first polarization adjustment member is located between the third polarization splitter surface and the first reflection surface and between the second reflection surface and the first polarization splitter surface;

wherein the first linearly polarized light beam that enters through the receiving optical ports sequentially passes through the second polarization splitter surface and the third polarization splitter surface, is reflected by the second reflection surface, and passes through the first polarization adjustment member to travel to the first polarization splitter surface; wherein the second linearly polarized light beam that enters through the receiving optical ports is sequentially reflected by the second polarization splitter surface and the third polarization splitter surface, passes through the first polarization adjustment member, and is reflected by the first reflection surface to travel to the first polarization splitter surface; wherein the first linearly polarized light beam and the second linearly polarized light beam are combined into the first combined light beam at the first polarization splitter surface, so as to be output from the common optical port;

wherein the compound optical signal that enters through the common optical port is split into the third linearly polarized light beam and the fourth linearly polarized light beam at the first polarization splitter surface; wherein the third linearly polarized light beam travels to the first polarization adjustment member to change a polarization state thereof, the third linearly polarized light beam is polarized into a fifth linearly polarized light beam, and the fifth linearly polarized light beam is reflected by the second reflection surface to travel to the third polarization splitter surface; wherein the fourth linearly polarized light beam is sequentially reflected by the first polarization splitter surface and the first reflection surface to travel to the first polarization adjustment member to change a polarization state thereof, the fourth linearly polarized light beam is polarized into a sixth linearly polarized light beam, and the sixth linearly polarized light beam travels to the third polarization splitter surface; wherein the fifth linearly polarized light beam and the sixth linearly polarized light beam are combined into the second combined light beam at the third polarization splitter surface, so as to be output from the emittance optical port.

7. The optical circulator according to claim 6, wherein the two receiving optical ports are respectively located on one side of the second prism and one side of the third prism, and the emittance optical port is located on one side of the fourth prism.

8. The optical circulator according to claim 3, wherein the second polarization beam splitter member further includes a third reflection surface, the third reflection surface is disposed on a surface of the second prism that faces away from the second polarization splitter surface, and the third reflection surface is configured to reflect linearly polarized light beams that enter through the two receiving optical ports to the second polarization splitter surface.

9. The optical circulator according to claim 1, wherein the optical circulator further comprises a second polarization adjustment member and a third polarization adjustment member that are respectively located on the two receiving optical ports, and the second polarization adjustment member and the third polarization adjustment member are configured to adjust light beams that enter the two receiving optical ports into two linearly polarized light beams having polarization directions that are perpendicular to each other.

10. The optical circulator according to claim 1, wherein the optical circulator further comprises a third polarization beam splitter member, the third polarization beam splitter member is disposed in front of the two receiving optical ports, and the third polarization beam splitter member is configured to split an incident light beam having polarization states into a P polarization light beam and an S polarization light beam and respectively transmit the P polarization light beam and the S polarization light beam to the two receiving optical ports of the second polarization beam splitter member.

11. An optical module, comprising:
the optical circulator as claimed in claim 1;
at least two emitting members respectively disposed opposite to the at least two receiving optical ports of the optical circulator;
a receiving member disposed opposite to the emittance optical port; and
an optical interface disposed opposite to the common optical port;
wherein light beams respectively emitted by each of the emitting members respectively travel to a corresponding one of the receiving optical ports disposed opposite to each of the emitting members, and an optical isolator and a half-wave plate are sequentially disposed between each of the emitting members and the corresponding one of the receiving optical ports of the optical circulator; wherein, before plurality ones of the incident light beam travel to the receiving optical ports, the optical isolator and the half-wave plate respectively polarize a part of the plurality of incident light beams into the first linearly polarized light beam, and another part of the plurality of incident light beams into the second linearly polarized light beam; wherein the first linearly polarized light beam and the second linearly polarized light beam are combined by the optical circulator into the first combined light beam that is output from the common optical port to the optical interface, and the first combined light beam is output to external optical communication devices by the optical interface;
wherein the optical interface is further configured to receive an external compound optical signal and transmit the external compound optical signal that is received to the common optical port of the optical circulator;
wherein the receiving member is configured to receive the second combined light beam emitted from the emittance optical port of the optical circulator.

12. The optical module according to claim 11, wherein each of the emitting members includes a wavelength division multiplexer and a plurality of optical emitting units, and light beams emitted by each of the plurality of optical emitting units are combined by the wavelength division multiplexer into one combined light beam that passes through the optical isolator and the half-wave plate to travel to the second polarization beam splitter member of the optical circulator.

13. The optical module according to claim 11, wherein the receiving member includes a wavelength division demultiplexer and a plurality of optical receiving units, and the wavelength division demultiplexer is configured to demultiplex the second combined light beam emitted from the emittance optical port to obtain a plurality of demultiplexed light beams and transmit the plurality of demultiplexed light beams to the plurality of optical receiving units that are disposed opposite to the wavelength division demultiplexer.

* * * * *